(12) United States Patent
Kalyanasundharam

(10) Patent No.: US 12,105,952 B2
(45) Date of Patent: Oct. 1, 2024

(54) GLOBAL ADDRESSING FOR SWITCH FABRIC

(71) Applicant: ADVANCED MICRO DEVICES, INC., Santa Clara, CA (US)

(72) Inventor: Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1 day.

(21) Appl. No.: 17/957,469

(22) Filed: Sep. 30, 2022

(65) Prior Publication Data

US 2023/0112007 A1  Apr. 13, 2023

Related U.S. Application Data

(60) Provisional application No. 63/253,747, filed on Oct. 8, 2021.

(51) Int. Cl.
G06F 3/06 (2006.01)

(52) U.S. Cl.
CPC .......... *G06F 3/0607* (2013.01); *G06F 3/0629* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 9,537,751 B2* | 1/2017 | Park | H04L 49/15 |
| 11,182,309 B2* | 11/2021 | Feehrer | G06F 12/1027 |
| 2006/0206603 A1* | 9/2006 | Rajan | H04L 67/1097 |
| | | | 709/223 |
| 2014/0025770 A1* | 1/2014 | Warfield | G06F 16/256 |
| | | | 709/213 |
| 2018/0167352 A1* | 6/2018 | Worley | H04L 69/22 |
| 2021/0004171 A1* | 1/2021 | Li | G06F 3/061 |
| 2022/0075520 A1* | 3/2022 | Tavallaei | G06F 3/0644 |

OTHER PUBLICATIONS

Das Sharma, Debendra and Siamak Tavallaei, "Commute Express Link 2.0 White Paper," Compute Express Link™: The Breakthrough CPU-to-Device Interconnect, Nov. 2020 <https://www.computeexpresslink.org/resource-library> Accessed: Aug. 31, 2022. 4 Pages.

* cited by examiner

*Primary Examiner* — Edward J Dudek, Jr.
*Assistant Examiner* — Ralph A Verderamo, III

(57) ABSTRACT

Systems, methods, and techniques are provided for a fabric addressable memory. A memory access request is received from a host computing device attached via one edge port of one or more interconnect switches, the memory access request directed to a destination segment of a physical fabric memory block that is allocated in local physical memory of the host computing device. The edge port accesses a stored mapping between segments of the physical fabric memory block and one or more destination port identifiers that are each associated with a respective edge port of the fabric addressable memory. The memory access request is routed by the one edge port to a destination edge port based on the stored mapping.

20 Claims, 7 Drawing Sheets

GLOBAL ADDRESSING FOR SWITCH FABRIC

BACKGROUND

High-speed central processing unit (CPU)-to-device and CPU-to-memory connections are typically designed for high performance distributed computing, such as for use by distributed artificial intelligence (AI) operations, cloud computing and/or data center operations, and other distributed computing operations. As interconnected systems increase in size and complexity, demands on cache-coherent interconnects for processors, accelerators, and memory devices increase.

BRIEF SUMMARY OF SELECTED EMBODIMENTS

The present disclosure provides systems, methods, and techniques for facilitating connection of a large number of host devices, accelerators, and memory devices via a scalable switchable interconnect fabric.

Embodiments of systems, methods, and techniques described herein provide for establishing and operating a global fabric addressable memory. In certain embodiments, a memory access request is received from a host computing device attached via one edge port of one or more interconnect switches, the memory access request directed to a destination segment of a physical fabric memory block that is allocated in local physical memory of the host computing device. The edge port accesses a stored mapping between segments of the physical fabric memory block and one or more destination port identifiers that are each associated with a respective edge port of the fabric addressable memory. The memory access request is routed by the one edge port to a destination edge port based on the stored mapping.

In certain embodiments, a system comprises a fabric addressable memory connected via one or more interconnect switches having a plurality of edge ports; and a plurality of nodes that are each connected to the one or more interconnect switches via a respective edge port of the plurality of edge ports. Each interconnect switch of at least some of the plurality of the one or more interconnect switches is to store a mapping between locations in a physical fabric memory block of a connected node and one or more destination port identifiers (DPIDs) that are each associated with a respective edge port of the plurality of edge ports; and each edge port of at least some edge ports of the plurality of edge ports is to route a memory access request, based on the stored mapping, from a sending node to a destination edge port of the plurality of edge ports.

The system may further comprise a fabric manager to segment the physical fabric memory block into a plurality of fabric memory segments, and to communicate a size of the fabric memory segments to the one or more nodes, such that each mapped location in the physical fabric memory block is a fabric memory segment of the plurality of fabric memory segments. The fabric manager may further be to associate each fabric memory segment of the plurality of fabric memory segments with an assigned DPID.

Each of the plurality of nodes may be associated with at least one domain of a plurality of domains of the fabric addressable memory, such that the sending node is associated with a first domain of the plurality of domains, and such that the destination edge port is connected to a node associated with a second domain of the plurality of domains.

Each node of a subset of the plurality of nodes may comprise a host computing device, such that each host computing device associated with a respective domain of the plurality of domains allocates an identically sized portion of memory as the physical fabric memory block. The first domain and second domain may comprise a first cluster of domains, such that each edge port of the at least some edge ports is further to prevent routing of an additional memory access request based on a destination of the additional memory access request being associated with a third domain that is not included in the first cluster of domains.

The memory access request may be an interleaved memory access request to a location in the physical fabric memory block of the sending node that is mapped to multiple DPIDs, such that each of the multiple DPIDs is associated with an edge port respectively connected to one of the multiple nodes.

To route the memory access request may include to decode, based on the stored mapping, a host physical address indicated by the memory access request.

Each node may comprise a host computing device, an accelerator, or a memory device.

In certain embodiments, a method may comprise receiving, from a host computing device attached via one edge port of a plurality of edge ports of one or more interconnect switches connecting a fabric addressable memory, a memory access request directed to a destination segment of a physical fabric memory block, the physical fabric memory block being allocated in local physical memory of the host computing device; accessing, by the one edge port, a stored mapping between segments of the physical fabric memory block and one or more destination port identifiers (DPIDs) that are each associated with a respective edge port of the plurality of edge ports; and routing, by the one edge port and based on the stored mapping, the memory access request to a destination edge port of the plurality of edge ports.

The method may further comprise segmenting, by a fabric manager of the fabric addressable memory, the physical fabric memory block into a plurality of segments of the physical fabric memory block; and communicating, by the fabric manager, a size of the segments to a plurality of nodes of the fabric addressable memory. The method may further comprise associating, by the fabric manager, each segment of the plurality of fabric memory segments with a one or more DPIDs that are each associated with an edge port of the plurality of edge ports.

The host computing device may operate as one node of a plurality of nodes of the fabric addressable memory, each node being associated with at least one domain of a plurality of domains of the fabric addressable memory, such that the host computing device is associated with a first domain of the plurality of domains, and such that the destination edge port is connected to a node associated with a second domain of the plurality of domains. The method may further comprise allocating, by each host computing device associated with a respective domain of the plurality of domains, an identically sized portion of memory as the physical fabric memory block.

The memory access request may be an interleaved memory access request to multiple nodes of the fabric addressable memory, such that the destination segment is mapped to multiple DPIDs that are each associated with an edge port respectively connected to one of the multiple nodes.

Routing the memory access request may include decoding, based on the stored mapping, a host physical address indicated by the memory access request.

The fabric addressable memory may be connected to each of a plurality of nodes via the plurality of edge ports, each node of the plurality of nodes comprising a host computing device, an accelerator, or a memory device.

In certain embodiments, a system may comprise one or more interconnect switches having a plurality of edge ports that are each operable to connect to a node of a fabric addressable memory, such that each interconnect switch stores mapping information that maps one or more destination port identifiers (DPIDs) of the fabric addressable memory to each of multiple fabric memory segments of a physical fabric memory block, wherein the physical fabric memory block is locally allocated by each of one or more nodes connected to the plurality of edge ports; and a fabric manager to segment the physical fabric memory block into the multiple fabric memory segments, associate each fabric memory segment of the plurality of fabric memory segments with an assigned DPID, and communicate a size of the fabric memory segments to the one or more connected nodes.

Each edge port of at least some edge ports of the plurality of edge ports may be to route a memory access request, based on the stored mapping, from a sending node to a destination edge port of the plurality of edge ports.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
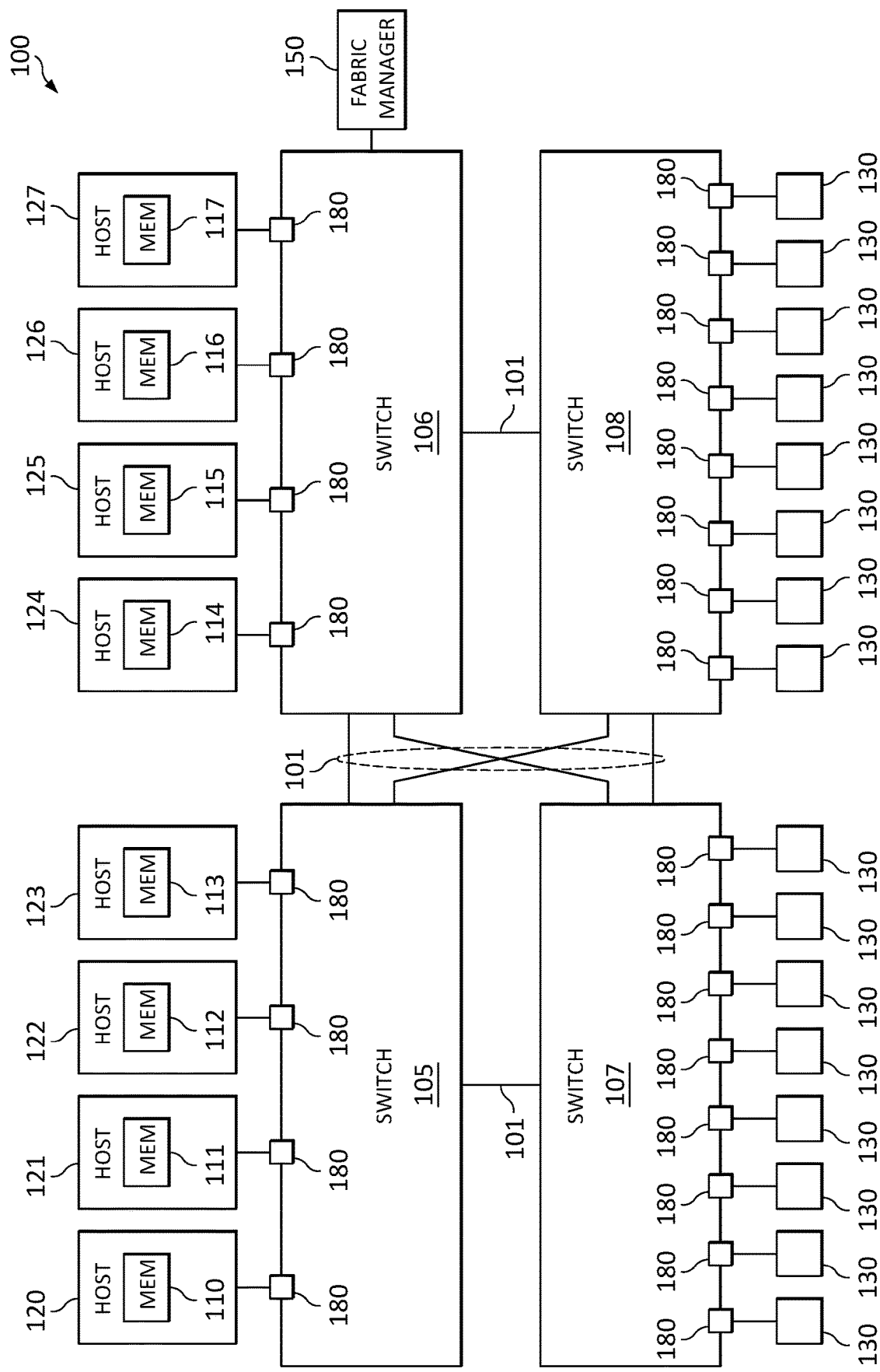
FIG. 1 illustrates a simplified block diagram of an example global addressable fabric system in accordance with one or more embodiments.

As a general overview, embodiments of techniques described herein include systems, methods, and devices implementing a global addressable fabric (GAF) system that facilitates connection of a large number of host computing systems, accelerators, and memory devices through a switchable interconnect to enable a common infrastructure for resource disaggregation, software-composable servers and highly scalable processing. In some embodiments, a GAF system architecture supports operations via multi-level switches with inter-switch links. The GAF system provides a multilevel switched network that uses fabric-wide unique global port identifiers and supports port-based routing (PBR), such that each fabric edge port (FEP) of the GAF system is assigned a unique destination port identifier (DPID). As used herein, an edge port of a multi-switch interconnect fabric is one that is directly connected to a host computing system or other device, rather than another switch or shared network segment.

Embodiments of techniques described herein provide a GAF system architecture as a fabric addressable memory with global addressing. One or more local domains utilize the GAF system architecture to compose larger systems of host, device, and memory resources that include many small systems, with the relevant GAF system thereby supporting independent domains with pooled memory using multi-layer fabric link switching in some embodiments. Address decoding is performed at each switch egress port, and one or more discoverable address decoders are located at each switch ingress port. The shared memory provided by the GAF system (referred to herein as the fabric attached memory or FAM) supports sharing between host computing systems (including virtual hosts) and supports coherency among those host computing systems. As described elsewhere herein, in at least some embodiments, devices attached to the GAF system are dedicated to a domain and shared only between hosts of that domain in some embodiments. In other embodiments, devices attached to the GAF system are shared between domains.

The GAF system provides (via the FAM) a highly scalable memory resource accessible by all hosts and peer devices in a port-based routing (PBR) system. FAM ranges can be assigned exclusive to a single host or shared by multiple hosts. When shared, multi-host cache coherency is managed by either software or hardware. In certain embodiments, access rights to delineated ranges of the FAM address space is enforced by a relevant fabric edge port (FEP) and a target FAM device.

In certain embodiments, memory of devices attached to the GAF system are shared and accessed by hosts from multiple domains using a memory access protocol that supports device-attached memory. The memory access protocol is used for multiple different memory attachment options, including when the memory controller is located in the host CPU, when the memory controller is within an accelerator device, or when the memory controller is moved to a memory buffer chip. In certain embodiments, the memory access protocol applies to different memory types (e.g., volatile and/or persistent) and configurations (e.g., flat or hierarchical). In addition, the shared portion of memory of such attached devices is accessed by peer devices from one or multiple domains.

FIG. 1 illustrates a simplified block diagram of an example GAF system 100. A group of interconnect switches (switches) 105, 106, 107, 108 are connected to one another via a collection of links 101. Each of multiple host computing systems (hosts) 110, 111, 112, 113, 114, 115, 116, 117 (collectively referred to as hosts 110-117) has a respective local memory 120, 121, 122, 123, 124, 125, 126, 127 (collectively referred to as local memories 120-127), and is connected to one of switches 105, 106. In addition, each of a plurality of devices 130 (e.g., peripheral devices, external memory devices, storage devices, etc.) is connected to one of switches 107, 108. Each of hosts 110-117 and devices 130 serves as a node on the GAF system and is connected to one of the switches 105, 106, 107, 108 via an egress port (edge port) 180. Typically, edge ports connected to a host computing system are referred to as upstream edge ports or root ports, while edge ports connected to non-host devices (such as devices 130) are referred to as downstream edge ports. In either case, nodes on the GAF system may be generically referred to herein as edge port devices based on their connection to the GAF system via a respective upstream or downstream edge port.

In various embodiments, the GAF system 100 supports devices of multiple distinguishable types. For ease of reference, as discussed herein, support for such devices includes support for a first type (type 1 devices) that includes specialized accelerators with no local memory, such as smart networking interface cards (NICs), which rely on coherent access to host memory; a second type (type 2 devices) that includes general-purpose accelerators (e.g., a graphics processing unit (GPU), application-specific integrated circuit (ASIC), or field-programmable gate array (FPGA)) which typically include high-performance and/or high-bandwidth local memory, such that the devices can coherently access a host's local memory and/or provide coherent or non-coherent access to device local memory from the host; and a third type (type 3 devices, such as memory expansion boards and storage-class memory) that provides a host attached to the GAF system 100 with low-latency access to local and/or non-volatile storage. As used herein, accelerators are devices that are used by software running on host processors to offload or perform any type of compute or I/O task. Examples of accelerators include programmable agents, fixed function agents, or reconfigurable agents (e.g., FPGAs). In certain embodiments the GAF system 100 further supports fabric addressable memory (FAM) devices, which are memory devices capable of processing fabric addresses associated with a global addressing scheme of the GAF system. In certain embodiments, a FAM memory device performs PBR operations of such a global addressing scheme.

In the depicted embodiment, the GAF system 100 further includes a fabric manager (FM) 150, which handles initialization and configuration of the GAF system 100—for example, assigning a set of devices and their connected downstream edge ports to a host and its associated connected root port, essentially composing a system; hot-swap integration and/or removal of hosts and devices to/from the GAF system; and error handling. While the switched topology of the example GAF system 100 is depicted as an intercross topology, various other topologies may be used.

Figure 2:
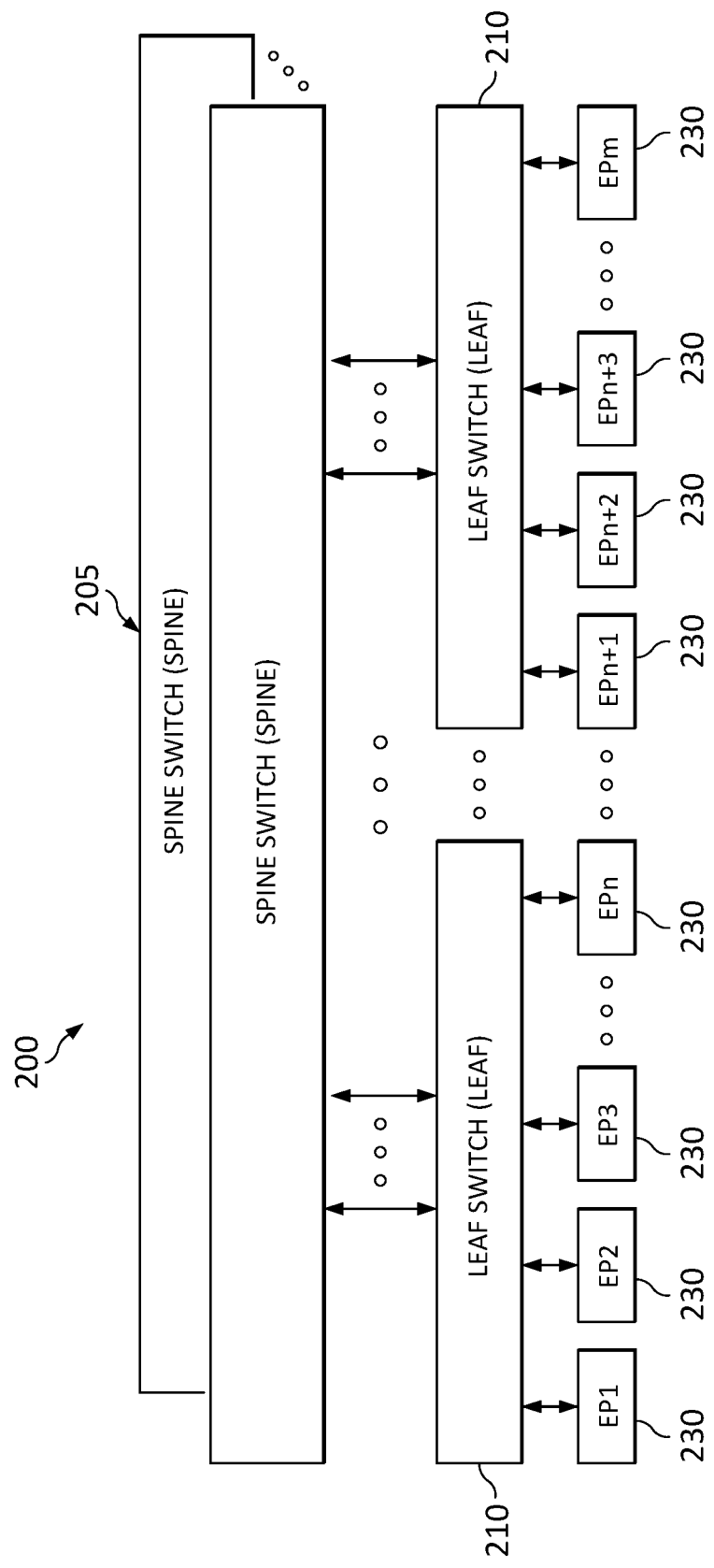
FIG. 2 illustrates a simplified block diagram of another example global addressable fabric system in accordance with one or more embodiments.

FIG. 2 illustrates a simplified block diagram of another example GAF system 200, in which the fabric topology provides one or more spine switches (or spines) 205 that are each connected to a plurality of leaf switches (or leaves) 210. In turn, each of a quantity l of leaves 210 are connected to edge port devices 230 via a quantity of edge ports (not separately depicted here), with each leaf having n edge ports such that collectively, the plurality of leaves 210 in the fabric addressable memory 200 has a total of l×n=m edge ports. It will be appreciated that additional topologies may be advantageously utilized for various applications, such as for machine learning accelerators, data analytics or other map & reduce applications, etc.

As used herein, a domain is a set of host and device ports with a single private local Host Physical Address space (HPA). Each domain is typically owned by a single hypervisor or OS instance. A cluster is a set of domains sharing a consistent view of a shared Fabric Physical Address space (FPA) within each domain's local HPA. A single fabric addressable memory includes one or many clusters, and each cluster includes one or many domains. In certain embodiments, the switch fabric is fully coherent only within a particular domain, with each domain operating as a virtual host (VH).

Figure 3:
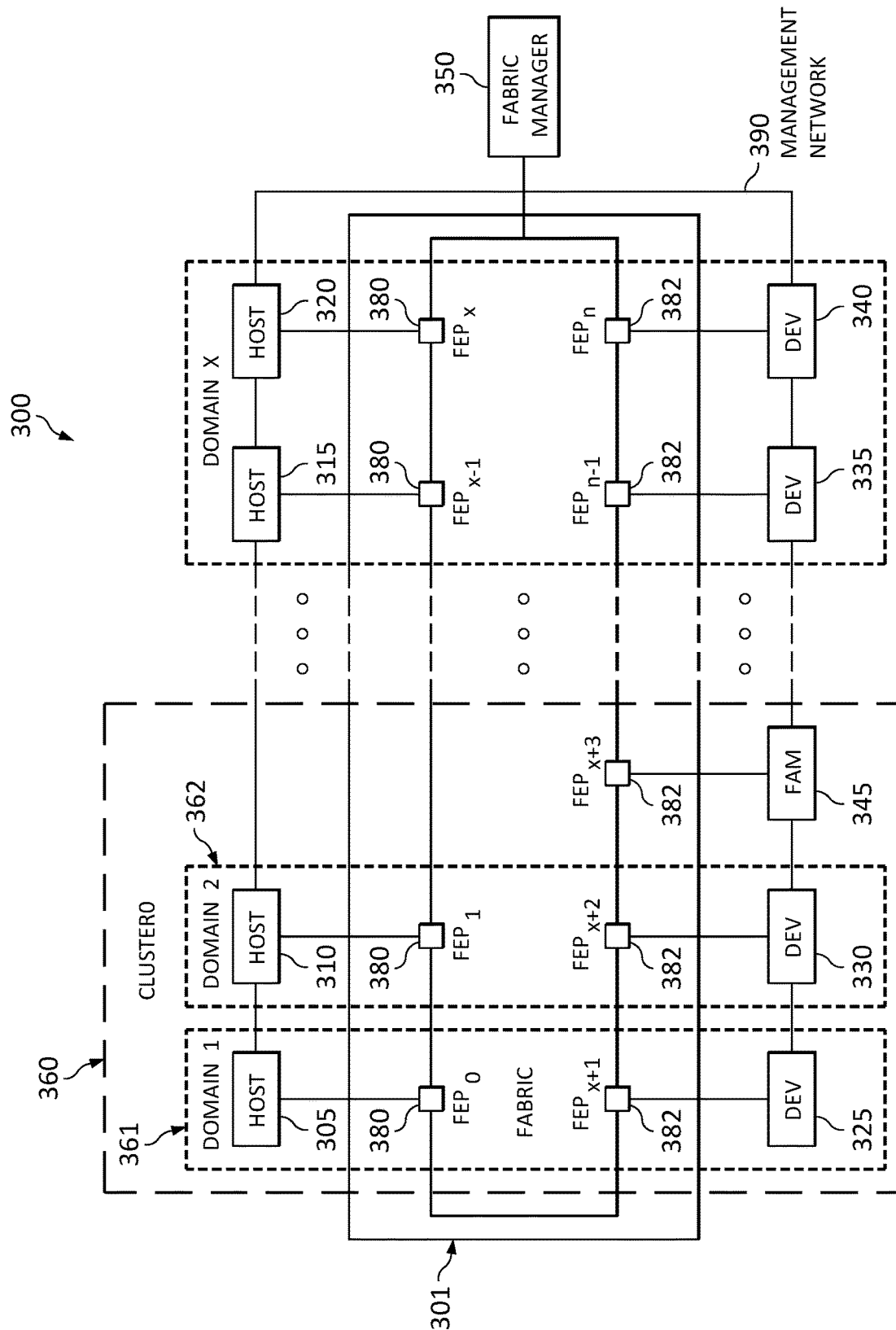
FIG. 3 illustrates a global addressable fabric system in accordance with one or more embodiments.

FIG. 3 illustrates a GAF system 300 in accordance with one or more embodiments. In the depicted embodiment, the GAF system 300 comprises switchable fabric 301 having a quantity of individual switch devices (not shown) that collectively include a total of n fabric edge ports (FEP), such that each FEP can connect to a host via upstream fabric edge port 380 or a device via downstream fabric edge port 382.

In the depicted embodiment, a first host computing system (host) 305 operates as part of a Domain 361 and is connected to the GAF system 300 via an upstream fabric edge port $FEP_0$. Domain 361 further includes a device 325, which is connected to the GAF system 300 via a downstream fabric edge port $FEP_{x+1}$. A second host 310 is connected to the GAF system 300 via a second upstream edge port $FEP_1$ and operates as part of a Domain 362, which further includes a device 330 connected to the GAF system via downstream fabric edge port $FEP_{x+2}$. Hosts 315 and 320 are connected to the GAF system 300 as part of a Domain x via upstream fabric edge ports $FEP_{x-1}$ and $FEP_x$, respectively. Domains A and B further operate as part of a first cluster 360 (Cluster 0). As noted elsewhere herein, this means that Domains A and B share a consistent view of a single Fabric Physical Address space (FPA) within each domain's local Host Physical Address space (HPA). The first cluster 360 further includes a FAM device 345 attached to the GAF system 300 via $FEP_{x+3}$.

In the depicted embodiment of FIG. 3, a Fabric Manager (FM) 350 connects to the GAF system 300 and one or more endpoints of a management network 390. In certain embodiments, the FM 350 is responsible for the initialization and configuration of the GAF system (e.g., assigning a set of devices and their connected downstream edge ports to a host and its associated connected root port, essentially composing a system), as well as hot-swap integration and/or removal of hosts and devices to/from the GAF system. The management network 390 comprises any suitable multi-wire interface, such as a Serial Management Bus (SMBus), Inter-Integrated Circuit (I2C), Improved Inter-Integrated Circuit (I3C), Serial Peripheral Interface (SPI), ethernet, or other physical network interface.

Root ports of the GAF system 300 operate in the same domain (e.g., $FEP_{x-1}$ and $FEP_x$) or in different domains (e.g., $FEP_0$ and $FEP_1$). Root ports that are in the same domain maintain coherency with any devices attached to downstream edge ports associated with that domain. In at least some embodiments, devices that support shared FAM (e.g., FAM device 345) support hardware managed cache coherency across multiple system domains. Root ports in different domains communicate with one another using direct load/store, software messaging or DMA. Similarly, devices attached to the GAF system also communicate with one another using a direct load/store, software messaging or DMA. Support for host-to-host and device-to-device communications allow messaging traffic between hosts or devices to traverse the fabric without having to go through a data center network protocol.

As noted elsewhere herein, in certain embodiments, each host allocates two distinct regions of memory—a local physical address space (LPA) and a fabric physical address space (FPA)—within the range of its host physical address space (HPA). That is, for each host 305, 310, 315, 320 connected to the GAF system 300, its HPA space maps memory for that host that includes both local host memory (e.g., attached DRAM) and host-managed device memory (HDM).

A host's HDM is device-attached memory mapped to system-coherent address space and accessible to the host, typically using standard write-back procedures. Memory located on a non-host device attached to the GAF system 300 via downstream edge ports can either be mapped as HDM or as private device memory (PDM), which is a device-attached memory not mapped to system address space or directly accessible to Host as cacheable memory (e.g., memory located on Peripheral Component Interconnect Express (PCIe) devices). Host memory mapped as part of the HDM is typically allocated and maintained by software (such as an operating system, hypervisor, or driver) executing on the host.

The fabric physical address space (FPA) range maps the global address space of the GAF system 300 and shared regions of memory from hosts in other domains. Within a domain or cluster of domains, hosts and devices attached to the GAF system 300 may share and communicate via the shared FPA.

The FAM 345 provided by the GAF system 300 comprises a shared memory space that is common across all hosts and peer devices of a domain or cluster. To create shared memory, two or more HPA ranges (each from a different host) are mapped to the same FPA range. For addressing across domains in the global shared memory, the GAF system 300 supports both inter-domain access and shared memory access. For example, with continued reference to FIG. 3, each FEP exposes a portion (e.g., <=1 TB) of global shared memory; multiple logical port-IDs may be used for exposing larger blocks.

In some embodiments, FAM 345 address ranges may be interleaved across any power-of-two number of attached hosts and devices from 2 to 256, with an interleave granularity of 256B, 512B, 1 KB, 2 KB, 4 KB, 8 KB or 16 KB. Hosts and devices from anywhere in the GAF system 300 may be used to contribute memory to an interleave set. In at least some embodiments, destination port identifiers (DPIDs) associated with FEPs may be contiguous, and may be aligned on a natural boundary for interleaving.

Figure 4:
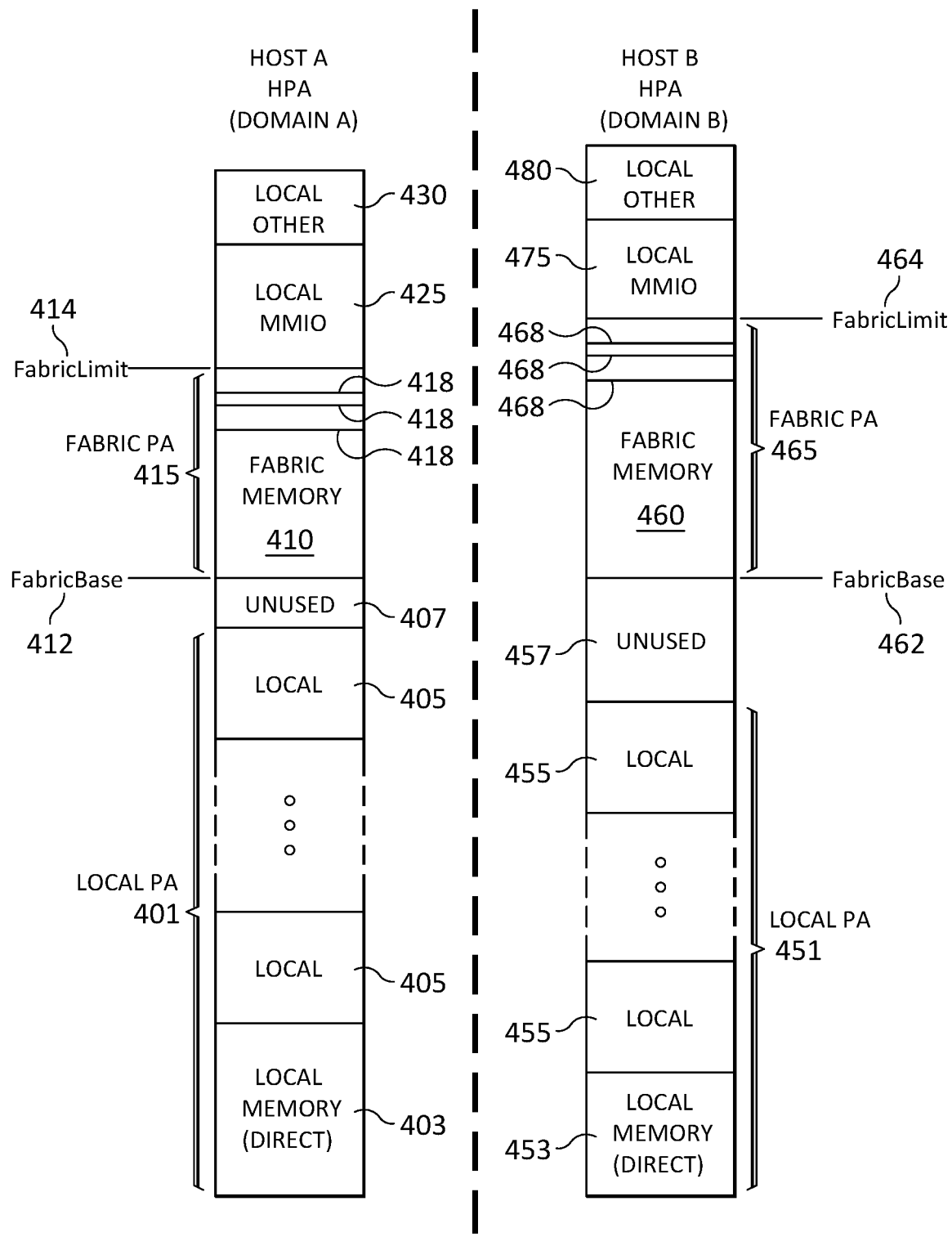
FIG. 4 depicts a block diagram of host physical address memory space for two hosts attached to a global addressable fabric system in accordance with one or more embodiments.

FIG. 4 depicts a block diagram of host physical address memory space for two hosts (e.g., hosts 305 and 310 of FIG. 3) attached to a global addressable fabric system (e.g., GAF system 300 of FIG. 3).

Hosts accessing FAM 345 allocate various memory address ranges in local memory of their Host Physical Address (HPA) space in any manner. For example, local physical address (LPA) space 401 of Host A and LPA space 451 of Host B each respectively have disparate block address ranges and/or memory block sizes for direct local memory blocks 403 and 453; local memory blocks 405 and 455; unused memory 407 and 457; local memory-mapped I/O (MMIO) blocks 425 and 475; and local other memory blocks 430 and 480. (It will be appreciated that in various host systems, the arrangement and distribution of local memory are distinct from that depicted.)

However, each host within a cluster allocates a contiguous memory address range for a Fabric Physical Address (FPA) space within its HPA space. In the depicted embodiment, Host A has allocated fabric memory block 410 in the FPA address range 415, defined by the FabricBase address parameter 412 and FabricLimit address parameter 414; similarly, Host B has allocated fabric memory block 460 in its FPA address range 465, as defined by the FabricBase address parameter 462 and FabricLimit address parameter 464. Fabric memory block 410 for host A and fabric memory block 464 host B are sized identically in the illustrated embodiment, as is the quantity of memory addresses between their respective sets of FabricBase and FabricLimit address parameters.

Memory access requests that fall within the Fabric Address range are routed to a selected FEP of the GAF system. To facilitate the port-based routing of such memory access requests, the fabric memory blocks 410 and 460 are each divided into N equal-sized fabric memory segments (as exemplified by fabric memory segments 418 and 468 within fabric memory block 410 and fabric memory block 460, respectively). As one non-limiting example, a GAF system is configured such that a fabric memory segment is any power-of-two size in a given range (e.g., from 64 GB to 8 TB). The fabric manager (e.g., FM 350 of FIG. 3) is responsible for configuring the segment size such that the quantity of segments multiplied by the segment size fully spans the FPA space.

Each segment of the FPA space (e.g., each of memory segments 418 and 468) is associated with a DPID, and therefore with an attached FAM 345 device or interleaved set of FAM 345 devices, such that requests with an HPA that falls anywhere within an associated segment are routed to the specified FAM 345 device (or a FAM 345 device within the interleave set) attached to the associated DPID. Segments are therefore used for request routing and may be larger than the accessible portion of a FAM 345 device's shared memory. In certain embodiments, any requests within the segment that are above the accessible portion of the FAM 345 device memory will result in an access error at the FAM 345 device, such as for error handling by the fabric manager.

With respect to cross-domain mapping, each host may expose all or a portion of its local memory to its own domain and/or other domains included in a cluster that also includes its own domain. A hypervisor or operating system executing on the local host owns its local memory even when exposed for cross-domain access, and is responsible for page fault and error handling.

In certain embodiments, the GAF system 300 employs a global address lookup table (not shown) comprising a mapping between locations in a physical fabric memory block of a connected node and one or more DPIDs that are each associated with a respective edge port of the GAF system 300. In such embodiments, a fabric manager 350 of the GAF system 300 may select various parameters for the lookup table (e.g., a number of entries in the lookup table, the HPA bits used for indexing into the lookup table, etc.) and to identify a local versus a global address.

Figure 5:
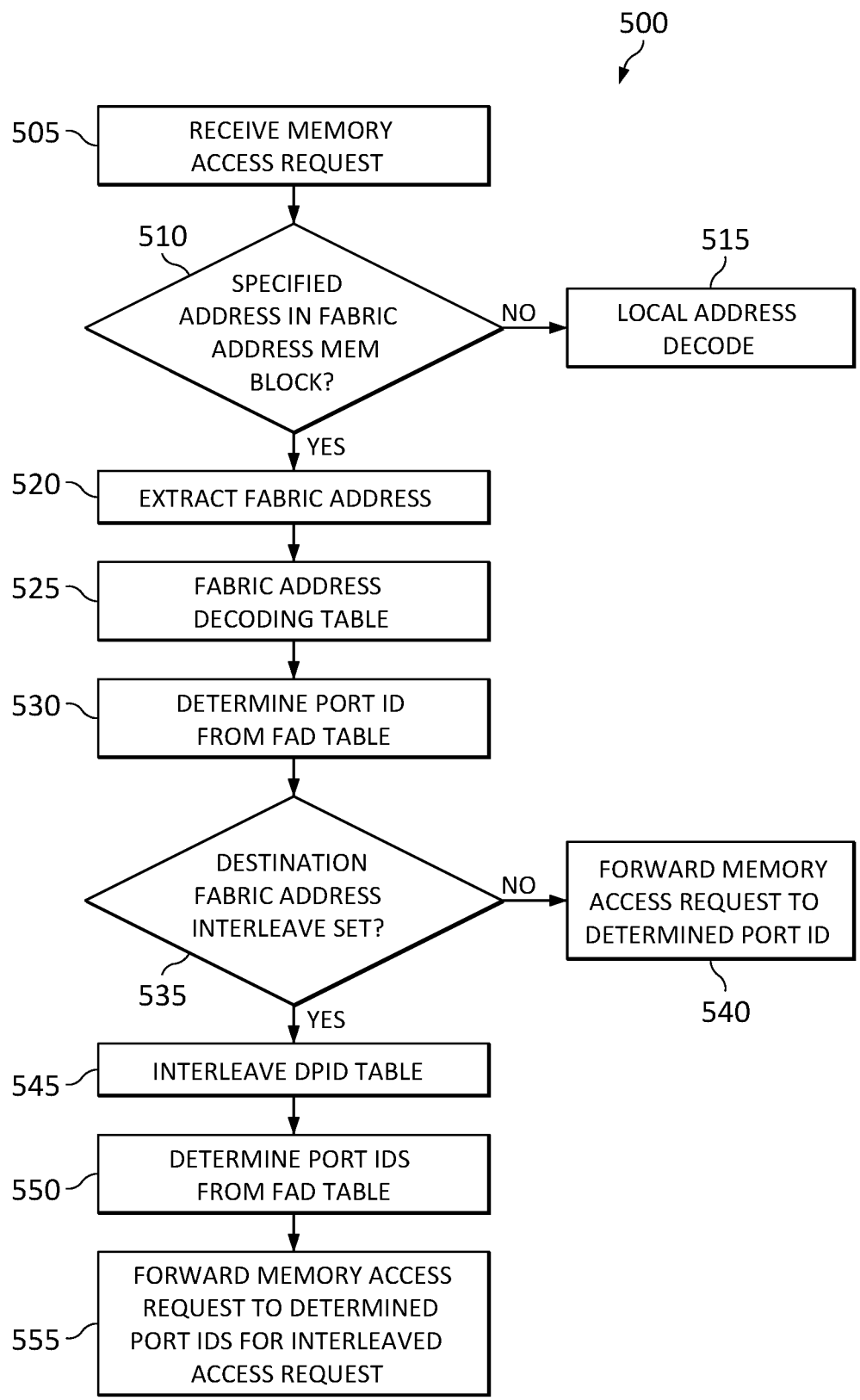
FIG. 5 depicts a process flow for memory access request routing, interleaving, and address translation between nodes of a global addressable fabric system in accordance with one or more embodiments.

FIG. 5 depicts a process flow 500 for memory access request routing, interleaving, and address translation between nodes of a GAF system, such as performed by a requesting FEP. Generally, FAM device memory access requests may arrive either at an upstream FEP from a host or at a downstream FEP from an attached device. In either case, for purposes of the current discussion the FEP receiving the memory access request will be referred to as the requesting FEP.

The routine begins at block 505, in which the requesting FEP receives a memory access request specifying a destination host physical address. The routine proceeds to block 510, in which the requesting FEP determines whether the specified HPA is within a fabric memory block (e.g., fabric memory block 410 of FIG. 4) mapped within an attached host's local physical address space (such as LPA 401 of FIG. 4).

If it is determined in block 510 that the HPA specified by the memory access request is not in the fabric address memory block of an attached host, the routine proceeds to block 515, in which the memory access request is submitted for local address decode operations.

If it was determined in block 510 that the HPA specified by the memory access request is in the fabric address memory block of an attached host, the routine proceeds to block 520 to extract a fabric address from the specified HPA. At block 525, the requesting FEP consults a lookup table (e.g., a fast address decoding (FAD) table) based on a fabric memory segment of the fabric address memory block in which the specified HPA is located.

At block 530, the requesting FEP determines, based on information included in the FAD lookup table, a destination port identifier (DPID) associated with a destination FEP for the specified HPA, and proceeds to block 535.

At block 535, the requesting FEP determines whether the DPID determined in block 530 is a reference to an interleave set of the GAF system. In at least some embodiments, the requesting FEP makes the determination based on an interleave mask included in a relevant entry of the FAD table. If the determined DPID is not indicated as a fabric address interleave set, the routine proceeds to block 540, in which it forwards the memory access request to an FEP associated with the determined DPID.

If it is determined at block 535 that the determined DPID is indicated (via the FAD table) to be a fabric address interleave set, the routine proceeds to block 550, in which the requesting FEP accesses an Interleave DPID Table (IDT) 545 to determine a set of DPIDs associated with the interleaved DPID earlier determined in block 530.

Following block 550, the routine proceeds to block 555, in which the requesting FEP forwards the memory access request to the set of interleaved DPIDs determined in block 550.

Figure 6:
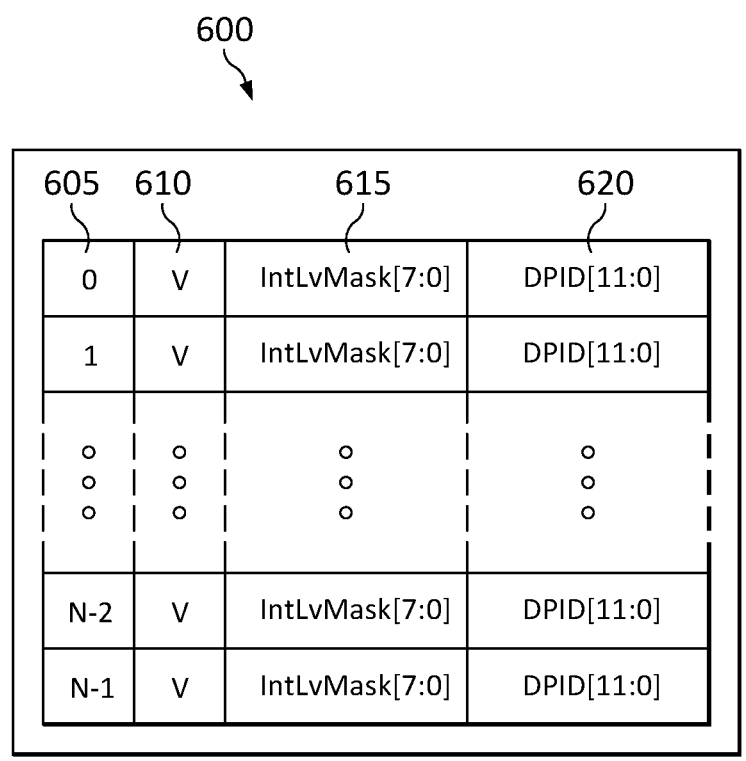
FIG. 6 depicts an example representation of a Fabric Address Segment Table used for mapping destination port identifiers to segments of a fabric address memory block in accordance with one or more embodiments.

FIG. 6 depicts an example representation of a Fabric Address Decoding (FAD) Table 600 used for mapping destination port identifiers to segments of a fabric address memory block in accordance with one or more embodiments. The FAD table 600 is a lookup table that associates a unique DPID with each connected FEP of a FAM. For non-interleaved memory locations, the FAD table 600 includes one FEP entry per fabric memory segment. In certain embodiments, the FAD table entry accessed is determined by bits Y:X of the specified HPA, where X=log 2 of the segment size (typically in bytes) and Y=X+log 2 of a quantity of entries in the FAD table. In at least some embodiments, the FAD table is configured and maintained by a fabric manager of the GAF system (e.g., fabric manager 350 of FIG. 3) and stored on each interconnect switch device of the GAF system. In the depicted embodiment, each entry of the FAD table (one for each of N fabric memory segments in the fabric address memory block) includes a segment index 605; a validity bit 610; and interleave mask 615; and a DPID 620. In various embodiments, the interleave mask 615 may indicate one or both of a quantity of interleaving ways and/or an interleaving granularity. Table 1 provides an example of interleave mask values that indicate various interleaving ways for potential association with an indexed fabric memory segment:

TABLE 1

| Value | Interleaving Ways |
|---|---|
| 0x0 | Interleaving disabled |
| 0x1 | Two-way interleaving |
| 0x2 | Four-way interleaving |
| 0x3 | Eight-way interleaving |
| 0x4 | 16-way interleaving |
| 0x5 | 32-way interleaving |
| 0x6 | 64-way interleaving |
| 0x7 | 128-way interleaving |
| 0x8 | 256-way interleaving |
| 0x9-0xF | Reserved |

Figure 7:
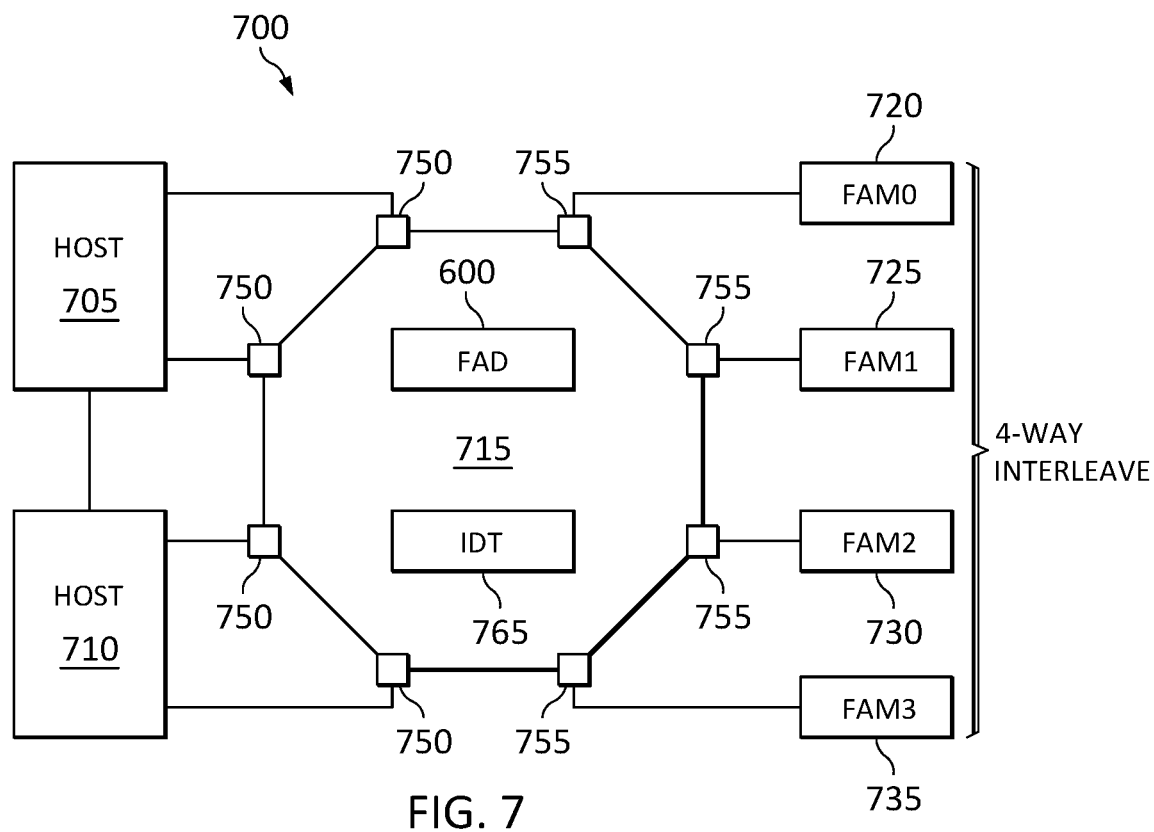
FIG. 7 depicts a simplified schematic block diagram of a portion of a GAF system configured for interleaved memory access in accordance with one or more embodiments.

FIG. 7 depicts an example simplified block diagram of a portion 700 of a GAF system configured for interleaved memory access in accordance with one or more embodiments. In the depicted embodiment, a host 705 and host 710 are engaged in two-way symmetric multi-processing (SMP) are each connected to an interconnect switch 715 via two upstream FEPs 750. The interconnect switch 715 stores a FAD table 600 as well as IDT 765, which together describe a mapping between locations in a physical fabric memory block locally allocated by each of the connected hosts 705 and 710 and one or more DPIDs that are each associated with a respective edge port of the interconnect switch 715. The interconnect switch 715 is connected via four FEPs 755 to each of four distinct fabric addressable memories FAM 720, FAM 725, FAM 730, and FAM 735. In the depicted configuration, four-way interleaved memory access requests to FAMs 720, 725, 730, 735 are directed to one or more fabric memory segments (as allocated by each of host 705 and host 710) that are identified by corresponding entries of the FAD table 760 and IDT 765 as associated with a four-way interleaved access to those distinct FAM devices.

In some embodiments, the apparatus and techniques described above are implemented in a system including one or more integrated circuit (IC) devices (also referred to as integrated circuit packages or microchips), such as the GAF system described above with reference to FIGS. 1-7. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A system comprising:
    a fabric addressable memory connected via one or more interconnect switches having a plurality of edge ports; and
    a plurality of nodes that are each connected to the one or more interconnect switches via a respective edge port of the plurality of edge ports;
    wherein each interconnect switch is to store a mapping between locations in a physical fabric memory block of a connected node and one or more destination port identifiers (DPIDs) that are each associated with a respective edge port of the plurality of edge ports; and
    wherein each edge port is to route a memory access request, based on the stored mapping, from a sending node to a destination edge port of the plurality of edge ports.

2. The system of claim 1, further comprising:
    a fabric manager configured to:
        segment the physical fabric memory block into a plurality of fabric memory segments; and
        communicate a size of the fabric memory segments to the one or more nodes;
    wherein each mapped location in the physical fabric memory block is a fabric memory segment of the plurality of fabric memory segments.

3. The system of claim 2, wherein the fabric manager is further configured to:
    associate each fabric memory segment of the plurality of fabric memory segments with an assigned DPID.

4. The system of claim 1, wherein each of the plurality of nodes is associated with at least one domain of a plurality of domains of the fabric addressable memory, wherein the sending node is associated with a first domain of the plurality of domains, and wherein the destination edge port is connected to a node associated with a second domain of the plurality of domains.

5. The system of claim 4, wherein each node of a subset of the plurality of nodes comprises a host computing device, and wherein each host computing device associated with a respective domain of the plurality of domains allocates an identically sized portion of memory as the physical fabric memory block.

6. The system of claim 4, wherein the first domain and second domain comprise a first cluster of domains, and wherein at least one edge port is further to prevent routing of an additional memory access request based on a destination of the additional memory access request being associated with a third domain that is not included in the first cluster of domains.

7. The system of claim 1, wherein the memory access request is an interleaved memory access request to a location in the physical fabric memory block of the sending node that is mapped to multiple DPIDs, and wherein each of the multiple DPIDs is associated with an edge port respectively connected to one of the plurality of nodes.

8. The system of claim 7, wherein the stored mapping includes an interleaved DPID table (IDT) that associates the location in the physical fabric memory block of the sending node with the multiple DPIDs.

9. The system of claim 1, wherein each edge port is to decode, based on the stored mapping, a host physical address indicated by the memory access request.

10. The system of claim 1, wherein each node comprises a host computing device, an accelerator, or a memory device.

11. A method, comprising:
    receiving, from a host computing device attached via one edge port of a plurality of edge ports of one or more interconnect switches connecting a fabric addressable memory, a memory access request directed to a destination segment of a physical fabric memory block, the physical fabric memory block being allocated in local physical memory of the host computing device;

accessing, by the edge port, a stored mapping between segments of the physical fabric memory block and one or more destination port identifiers (DPIDs) that are each associated with a respective edge port of the plurality of edge ports; and routing, by the edge port and based on the stored mapping, the memory access request to a destination edge port of the plurality of edge ports.

12. The method of claim 11, further comprising:

segmenting, by a fabric manager of the fabric addressable memory, the physical fabric memory block into a plurality of segments of the physical fabric memory block; and communicating, by the fabric manager, a size of the segments to a plurality of nodes of the fabric addressable memory.

13. The method of claim 12, further comprising:

associating, by the fabric manager, each segment of the plurality of segments with a one or more DPIDs that are each associated with an edge port of the plurality of edge ports.

14. The method of claim 11, wherein the host computing device operates as one node of a plurality of nodes of the fabric addressable memory, each node being associated with at least one domain of a plurality of domains of the fabric addressable memory, wherein the host computing device is associated with a first domain of the plurality of domains, and wherein the destination edge port is connected to a node associated with a second domain of the plurality of domains.

15. The method of claim 14, further comprising allocating, by each host computing device associated with a respective domain of the plurality of domains, a substantially identically sized portion of memory as the physical fabric memory block.

16. The method of claim 11, wherein the memory access request is an interleaved memory access request to multiple nodes of the fabric addressable memory, and wherein the destination segment is mapped to multiple DPIDs that are each associated with an edge port respectively connected to one of the multiple nodes.

17. The method of claim 11, wherein routing the memory access request includes decoding, based on the stored mapping, a host physical address indicated by the memory access request.

18. The method of claim 11, wherein the fabric addressable memory is connected to each of a plurality of nodes via the plurality of edge ports, each node of the plurality of nodes comprising a host computing device, an accelerator, or a memory device.

19. A system, comprising:

one or more interconnect switches having a plurality of edge ports that are each operable to connect to a node of a fabric addressable memory, wherein each interconnect switch stores mapping information that maps one or more destination port identifiers (DPIDs) of the fabric addressable memory to each of multiple fabric memory segments of a physical fabric memory block, and wherein the physical fabric memory block is locally allocated by each of one or more nodes connected to the plurality of edge ports; and a fabric manager to:

segment the physical fabric memory block into the multiple fabric memory segments;

associate each fabric memory segment of the multiple fabric memory segments with an assigned DPID; and communicate a size of the multiple fabric memory segments to the one or more connected nodes.

20. The system of claim 19, wherein each edge port of at least some edge ports of the plurality of edge ports is to route a memory access request, based on the stored mapping information, from a sending node to a destination edge port of the plurality of edge ports.

\* \* \* \* \*